United States Patent
Kleidermacher et al.

(10) Patent No.: US 10,325,105 B2
(45) Date of Patent: Jun. 18, 2019

(54) SINGLE-CHIP VIRTUALIZING AND OBFUSCATING STORAGE SYSTEM FOR PORTABLE COMPUTING DEVICES

(71) Applicant: Green Hills Software, Inc., Santa Barbara, CA (US)

(72) Inventors: David Noah Kleidermacher, Santa Barbara, CA (US); Daniel Jonathan Hettena, Princeton, NJ (US); Frank John Banul, IV, Richardson, TX (US)

(73) Assignee: GREEN HILLS SOFTWARE LLC, Santa Barbara, CA (US)

( * ) Notice: Subject to any disclaimer, the term of this patent is extended or adjusted under 35 U.S.C. 154(b) by 710 days.

(21) Appl. No.: 14/205,366

(22) Filed: Mar. 11, 2014

(65) Prior Publication Data

US 2014/0325681 A1    Oct. 30, 2014

Related U.S. Application Data

(60) Provisional application No. 61/778,352, filed on Mar. 12, 2013.

(51) Int. Cl.
  *G06F 21/57* (2013.01)
  *G06F 21/62* (2013.01)

(52) U.S. Cl.
  CPC ........ *G06F 21/6218* (2013.01); *G06F 21/575* (2013.01)

(58) Field of Classification Search
  CPC .................................................. G06F 21/6218
  See application file for complete search history.

(56) References Cited

U.S. PATENT DOCUMENTS

| | | | |
|---|---|---|---|
| 2007/0043896 A1 | 2/2007 | Daruwala et al. | |
| 2007/0179955 A1* | 8/2007 | Croft | G06F 3/1415 |
| 2007/0226795 A1* | 9/2007 | Conti | G06F 21/74 |
| | | | 726/22 |
| 2009/0164994 A1* | 6/2009 | Vasilevsky | G06F 9/45533 |
| | | | 718/1 |
| 2012/0079282 A1* | 3/2012 | Lowenstein | G06F 21/83 |
| | | | 713/189 |

OTHER PUBLICATIONS

PCT International Search Report dated Aug. 1, 2014 of International Application No. PCT/US14/23835. 17 Pages.

* cited by examiner

*Primary Examiner* — Tae K Kim
*Assistant Examiner* — Louis C Teng
(74) *Attorney, Agent, or Firm* — Barcelo, Harrison & Walker, LLP

(57) ABSTRACT

In certain embodiments, an information obfuscation service may be incorporated directly into the main applications processor of a portable computing device such that the applications processor and its relevant storage peripherals may be securely shared via a virtualization firmware module, avoiding the use of specialized hardware or major modifications of the operating system. The virtualizing and obfuscating storage firmware module may enable a much higher level of assurance in information-at-rest protection while using only the memory protection and privilege mode facilities inherent in common portable device applications microprocessors. The virtualizing and obfuscating storage firmware may interpose storage accesses originating from the operating system. This interposition may be performed seamlessly, without explicit knowledge of the operating system.

61 Claims, 4 Drawing Sheets

SINGLE-CHIP VIRTUALIZING AND OBFUSCATING STORAGE SYSTEM FOR PORTABLE COMPUTING DEVICES

CROSS REFERENCE TO RELATED APPLICATION

This application claims priority to U.S. Provisional Patent Application No. 61/778,352, filed Mar. 12, 2013, which is incorporated by reference herein in its entirety.

FIELD OF THE DISCLOSURE

The disclosure relates generally to methods for obfuscating information for portable computing devices; and more particularly to information-at-rest protection for portable computing systems.

GENERAL BACKGROUND

Information-at-rest protection is important for portable computing systems (such as smartphones) because these devices are commonly lost or stolen, and information obfuscation prevents an attacker from reading the sensitive data from the purloined system. In laptops, self-encrypting drives (SEDs) are a popular choice to implement obfuscated storage, because they provide hardware-based isolation of the information hiding subsystem (cryptographic functions provided within the drive itself) and excellent obfuscation (encryption/decryption) performance. However, smartphones and tablets commonly employ solid-state storage systems that are not amenable to the SED approach. Also, SEDs are specialized hardware, and mass-market portable devices require a solution that is hardware agnostic.

In order to provide a more easily deployable, scalable solution, there is a trend to incorporate storage encryption directly into portable device operating systems. For example, Apple OS X Lion and iOS incorporate storage encryption technology, as does Google Android. The problem with incorporating storage encryption into the portable device operating system is that these operating systems are extremely complicated and prone to vulnerabilities. Every popular portable device operating system suffers from serious vulnerabilities that enable malware and hackers to obtain "root" access which can then defeat the storage encryption layer, for example by stealing the encryption key or turning off the encryption service.

These weaknesses have also plagued SED solutions on laptops since the authentication process still executes on the platform operating system. For example, key logger malware can be inserted into the vulnerable operating system; the malware can then steal the user's passphrase, allowing an attacker to access sensitive data by impersonating as the authorized device user.

Accordingly, it is desirable to address the limitations in the art.

BRIEF DESCRIPTION OF THE DRAWINGS

By way of example, reference will now be made to the accompanying drawings, which are not to scale.

DETAILED DESCRIPTION

Figure 1:
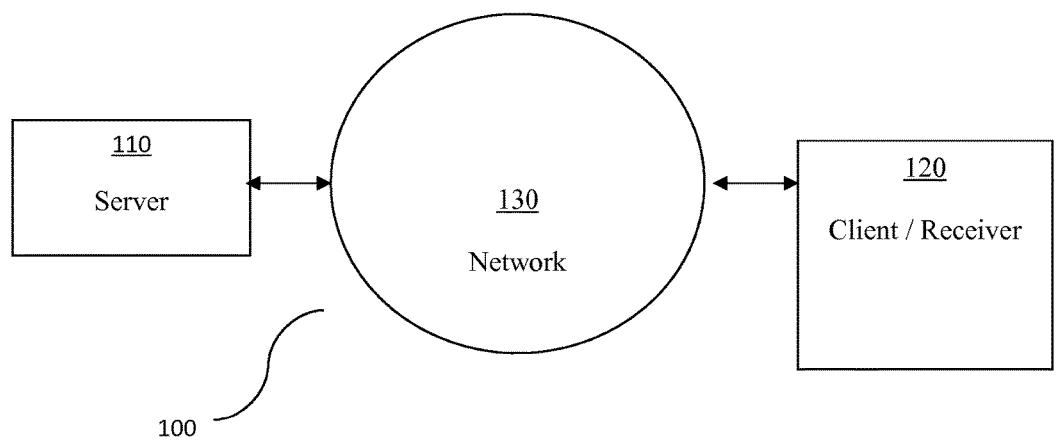
FIG. 1 illustrates an exemplary networked environment and its relevant components according to certain embodiments of the present invention.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example and without limitation, a floppy disk, a flexible disk, a hard disk, a magnetic tape, any other magnetic medium, a CD-ROM, a DVD, any other optical medium.

FIG. 1 depicts an exemplary networked environment 100 in which systems and methods, consistent with exemplary embodiments, may be implemented. As illustrated, networked environment 100 may include without limitation a content server 110, a receiver 120, and a network 130. The exemplary simplified number of content servers 110, receivers 120, and networks 130 illustrated in FIG. 1 can be modified as appropriate in a particular implementation. In practice, there may be additional content servers 110, receivers 120, and/or networks 130.

In certain embodiments, a receiver 120 may include without limitation any suitable form of multimedia playback device, including, without limitation, a cable or satellite television set-top box, a DVD player, a digital video recorder (DVR), or a digital audio/video stream receiver, decoder, and player. A receiver 120 may connect to network 130 via wired and/or wireless connections, and thereby communicate or become coupled with content server 110, either directly or indirectly. Alternatively, receiver 120 may be associated with content server 110 through any suitable tangible computer-readable media or data storage device (such as a disk drive, CD-ROM, DVD, or the like), data stream, file, or communication channel.

Network 130 may include without limitation one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, a cellular network and/or another type of suitable network, depending on the requirements of each particular implementation.

One or more components of networked environment 100 may perform one or more of the tasks described as being performed by one or more other components of networked environment 100.

Figure 2:
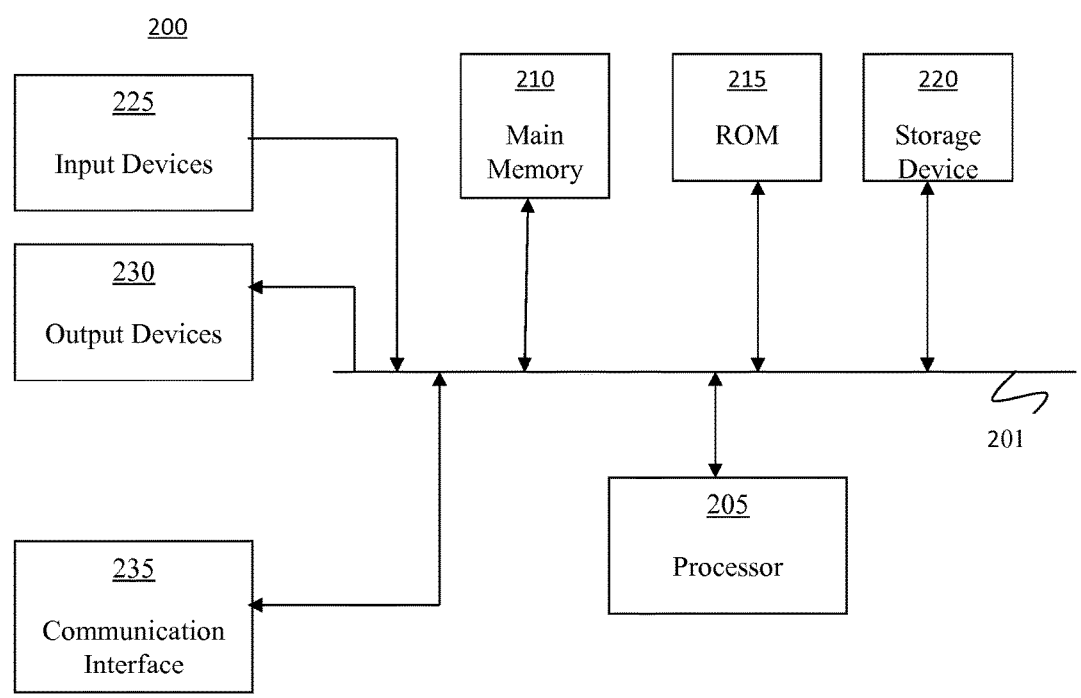
FIG. 2 is an exemplary block diagram of a computing device that may be used to implement aspects of certain embodiments of the present invention.

FIG. 2 is an exemplary diagram of a computing device 200 that may be used to implement aspects of certain embodiments of the present invention, such as aspects of content server 110 or of receiver 120. In certain embodiments, computing device 200 may be a mobile computing device which may include without limitation a smart phone or tablet device. Computing device 200 may include without limitation a bus 201, one or more processors 205, a main memory 210, a read-only memory (ROM) 215, a storage device 220, one or more input devices 225, one or more output devices 230, and a communication interface 235. Bus 201 may include without limitation one or more conductors that permit communication among the components of computing device 200.

Processor 205 may include without limitation any type of conventional processor, microprocessor, or processing logic that interprets and executes instructions. Main memory 210 may include without limitation a random-access memory (RAM) or another type of dynamic storage device that stores information and instructions for execution by processor 205. ROM 215 may include without limitation a conventional ROM device or another type of static storage device that stores static information and instructions for use by processor 205. Storage device 220 may include without limitation a magnetic and/or optical recording medium and its corresponding drive.

Input device(s) 225 may include without limitation one or more conventional mechanisms that permit a user to input information to computing device 200, such as a keyboard, a mouse, a pen, a stylus, handwriting recognition, voice recognition, biometric mechanisms, touch screen and the like. Output device(s) 230 may include without limitation one or more conventional mechanisms that output information to the user, including a display, a projector, an A/V receiver, a printer, a speaker, and the like. Communication interface 235 may include without limitation any transceiver-like mechanism that enables computing device/server 200 to communicate with other devices and/or systems. For example, communication interface 235 may include without limitation mechanisms for communicating with another device or system via a network, such as network 130 as shown in FIG. 1.

As will be described in detail below, computing device 200 may perform operations based on software instructions that may be read into memory 210 from another computer-readable medium, such as data storage device 220, or from another device via communication interface 235. The software instructions contained in memory 210 cause processor 205 to perform processes that will be described later. Alternatively, hardwired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via the network 130 shown in FIG. 1, such as Microsoft's Internet Explorer browser, Netscape's Navigator browser, Mozilla's Firefox browser, PalmSource's Web Browser, Google's Chrome browser or any other commercially available or customized browsing or other application software capable of communicating with network 130. The computing device 200 may also include a browser assistant. The browser assistant may include without limitation a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 200 and/or the network 130. For example, source data or other information received from devices connected to the network 130 may be output via the browser. Also, both the browser and the browser assistant are capable of performing operations on the received source information prior to outputting the source information. Further, the browser and/or the browser assistant may receive user input and transmit the inputted data to devices connected to network 130.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

In the following description, certain embodiments of the method are described in terms of particular data structures, preferred and optional enforcements, preferred control flows, and examples. Other and further application of the described method, as would be understood after review of this application by those with ordinary skill in the art, are within the scope of the invention.

Figure 3:
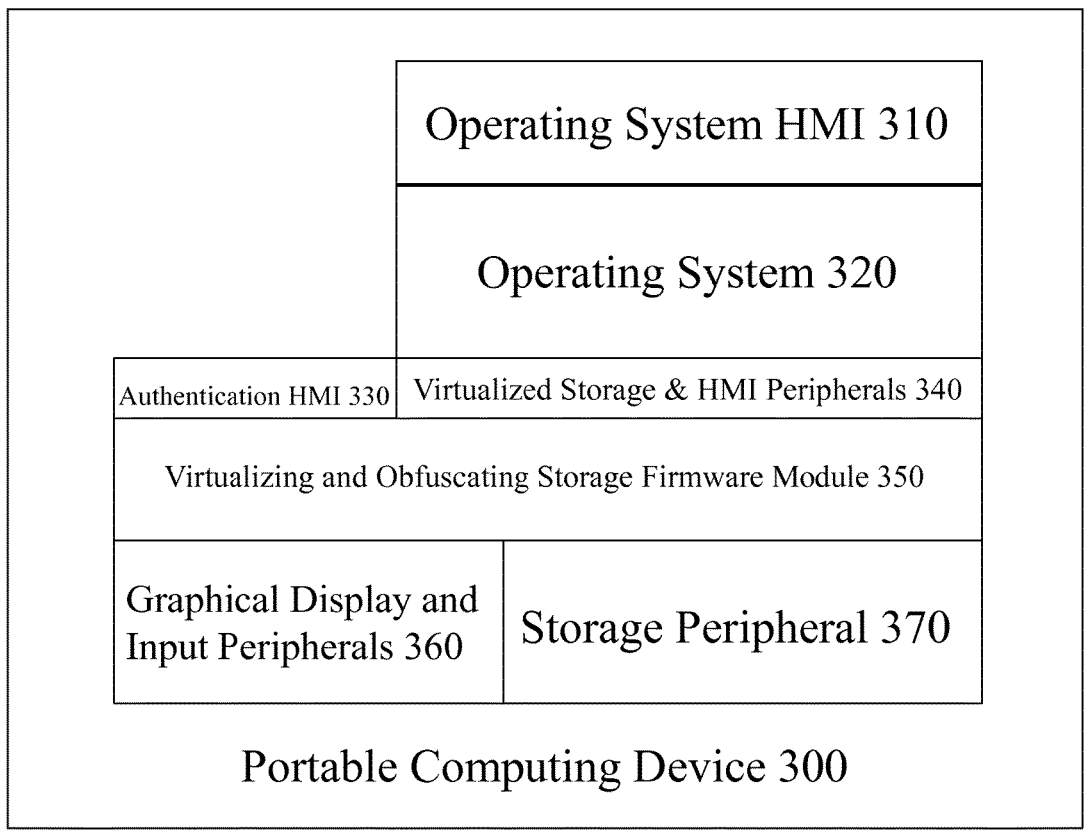
FIG. 3 illustrates an overview of a portable computing device, configured with a virtualizing and obfuscating storage firmware module in accordance with certain embodiments.

In certain embodiments as shown in FIG. 3, the information obfuscation service may be incorporated directly into the main applications processor of a portable computing device 300 such that the applications processor and its relevant peripherals (storage, display) may be securely shared via a virtualization firmware module 350, avoiding the use of specialized hardware or major modifications of the main operating system. The virtualizing and obfuscating storage firmware module 350 may enable a much higher level of assurance in information-at-rest protection while using only the memory protection and privilege mode facilities inherent in common portable device applications microprocessors. The virtualizing and obfuscating storage firmware may interpose storage accesses originating from the main operating system. When the main operating system attempts to write to storage, the virtualizing and obfuscating firmware module 350 may intercept the write request, obfuscate the write data, and then write the obfuscated data to the physical storage media. When the main operating system attempts to read from storage, the virtualizing and obfuscating firmware module may intercept the read request, read the data from the physical storage media 370, de-obfuscate the read data, and then forward the data to the main operating system. This interposition may be performed seamlessly, without explicit knowledge of the main operating system.

In certain embodiments, the virtualizing and obfuscating storage firmware 350 makes creative use of the portable device's graphical display and inputs 360 (e.g. touchscreen) to enable user authentication that unlocks the protected storage media 370 for use by the main operating system. The firmware module 350 may offer the user a mode of operation used for authentication that is distinct from the normal mode of operation using the main operating system's human-machine interface (HMI) 310. These modes of operation and multiple uses of shared graphical and input peripherals 360 may be accomplished by virtualizing those peripherals and using them to provide the user with a trusted indication regarding which mode is active.

Certain embodiments involve an information obfuscation service for portable computing devices. A virtualizing and obfuscating storage firmware module 350 may be incorporated into common, mass-market portable computing devices 300, such as smartphones and tablets, to provide this service. Authentication and obfuscation software components may comprise trusted firmware whose operation may be protected from the main portable device operating system 320 that may be assumed to be hostile (e.g. infiltrated with malware or under the control of a remote attacker). In certain embodiments, a single-chip design is disclosed without any specialized hardware; only the primary portable device applications microprocessor may be used by both the main operating system 320 and the virtualizing and obfuscating storage firmware module 350. The operating system 320 may operate as if it has access to a real storage peripheral 370, but in reality the virtualizing and obfuscating storage firmware module 350 may virtualize this peripheral. The firmware module 350 may perform authentication of the user and obfuscation of the data without the operating system's knowledge. This may result in a virtualized information obfuscation system 340 that is similar to a self-encrypting drive (SED) but that is fully isolated from the platform operating system 320 and can run on any storage medium without requiring any additional or specialized hardware.

In order to execute a trusted obfuscation service and a general-purpose operating system 320 on the same processor, some form of system and/or storage virtualization may be needed. Examples of firmware implementations that may provide a concurrently executing environment alongside, but securely separated from the main operating system 320, include without limitation hypervisors and Trusted Execution Environments (TEE). Obfuscation may be implemented using cryptographic encryption or other information hiding techniques. Because obfuscation is handled by the trusted virtualizing and obfuscating storage firmware module 350, no other untrusted applications on the platform (including the main operating system 320 itself) may access critical obfuscation components (such as a data encryption key).

In certain embodiments, one or more authenticator values (including but not limited to a typed passphrase, a bitstring read from an attached storage device like a secure digital card, or a bitstring read from a wirelessly connected device like an NFC dongle or smart card) may be securely entered by the portable device user and/or automatically detected and processed by the obfuscating storage firmware module to unlock the virtualized information storage system 340 so that data can be loaded and stored (using obfuscation) while the portable device is operated by the authorized user. The authenticators may be combined and/or converted to critical obfuscation parameters used to obfuscate the data. To avoid key logging and screen scraping type malware attacks within the user environment, the user pass-phrase input and associated graphical device management may be performed in the virtualizing and obfuscating storage firmware layer, beyond the reach of the main operating system 320.

Certain embodiments address the requirements for providing trustworthy small form factor handheld devices that can manage multiple User Domains, each of which may contain a full high-level OS (HLOS) such as Android and may be able to connect to multiple networks (e.g. Internet and sensitive enterprise networks) via wireless local area network (WLAN) and cellular wide area networks (WAN). Each domain may be considered a virtual "persona" in which the personas securely share the resources of a single physical device.

Each User Domain may be dedicated to a distinct security domain and/or community of interest. Authenticated access to the networks corresponding to these domains may be handled by a combination of domain-specific login/authentication and user-to-device authentication.

User Domain HLOS's may support the use of enterprise/OEM/carrier-preferred mobile device management (MDM) and security solutions.

The latest generation of applications microprocessors provide hardware support to partition memory, virtualize physical hardware, and mediate bus access, thereby isolating security sensitive tasks and applications while providing the user with the latest and greatest multimedia environments. While system virtualization technologies are prevalent in desktops and servers, they are only recently being used in the handheld space. Certain embodiments disclosed herein take the notion of system virtualization a step further by explicitly embracing it as a means to provide security in domains where handhelds have not previously been used.

In certain embodiments, a trusted path for human interface interactions that affect domain separation may be used to protect against inadvertent human error that may contribute to a loss of security. In certain embodiments, a high assurance means may be used to assure the user that he/she is interacting with the Domain that appears to be in focus on the screen. A visual domain indicator may provide this trusted path.

In certain embodiments, a User Authentication subsystem may be used to authenticate the user to the handheld device and, upon successful authentication, inform the vSED subsystems that they can unlock their encrypted disks for active use by the User Domains. The User Authentication subsystem may communicate with the I/O Manager subsystem in order to manifest its graphical user interface controls whenever a user authentication is required.

Trusted software may be used in the Supervisor Domain for user authentication (including the actual input and display of passphrases) to avoid key logging and screen scraping type malware attacks within the User Domains.

Figure 4:
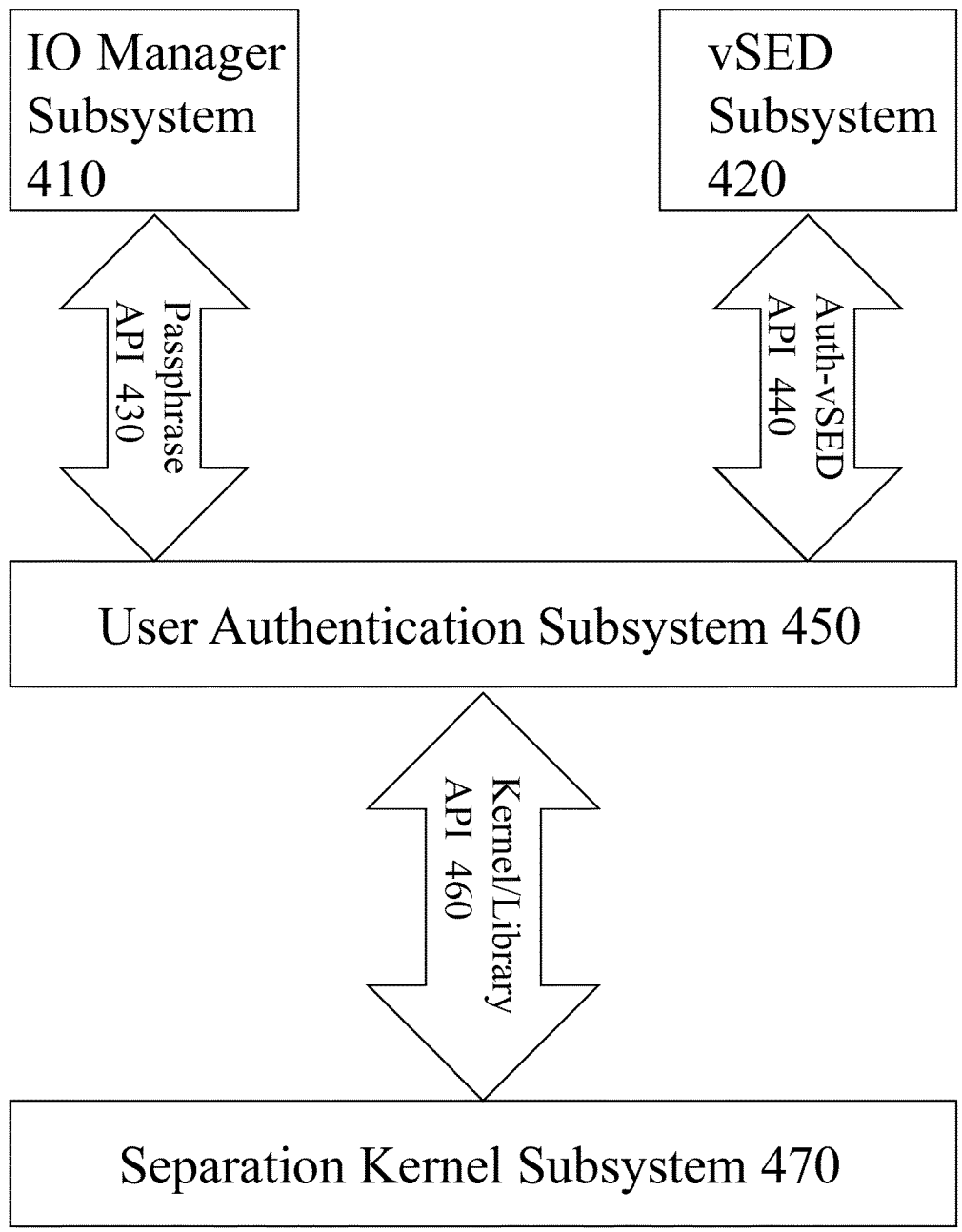
FIG. 4 illustrates a user authentication subsystem in accordance with certain embodiments.

In certain embodiments as shown in FIG. 4, a user authentication subsystem 450 manages human user login to the device and time-based session locking. User authentication subsystem 450 may interface with an I/O Manager Subsystem 410 using passphrase API 430 in order to obtain passphrase inputs and to initiate session locks. User authentication subsystem 450 may interface with vSED subsystem 420 using Auth-vSED API 440 to pass in the passphrase used to unlock the vSED encrypted disks for active use. User authentication subsystem 450 may also interface with Separation Kernel Subsystem 470 using the kernel/library API 460 to manage time and communication.

In certain embodiments, User Authentication may be enabled only when at least one User Domain employs vSED encryption. Authentication of passphrases may be performed only by vSED. In certain embodiments, vSED may implement time limits on the use of a key and the Authentication subsystem may force a user passphrase change following vSED's timing policy. While the User Authentication subsystem can be thought of as security-supporting for these actions, the session locking timing may be handled within the Authentication subsystem and may be security-enforcing.

In certain embodiments, each vSED subsystem 420 may provide full disk encryption services for its associated User Domain if the User Domain is configured for encryption (the vSED may communicate with the I/O Manager subsystem for vSED configuration items). vSED may encrypt data flowing from the User Domain before forwarding to the IO Manager subsystem 410 and decrypt in the reverse direction.

Storage security may be important for handheld systems used to process sensitive data because these devices are commonly lost or stolen, and encryption may prevent an attacker from reading the sensitive data from the stolen system. In laptops, self-encrypting drives (SEDs) are a popular choice, because they provide hardware-based isolation of the cryptographic subsystem (provided within the drive itself) and excellent encryption/decryption performance. However, smartphones and tablets commonly employ solid-state storage systems that are not amenable to the SED approach. Rather, there is a trend to incorporate storage encryption into the HLOS's. For example, Apple iOS incorporates storage encryption technology, as does Google Android. The problem with incorporating storage encryption into the HLOS is that it the HLOS is extremely sophisticated, prone to vulnerabilities, and generally untrusted. Every popular HLOS suffers from serious vulnerabilities that enable malware and hackers to obtain "root" access which can then defeat the storage encryption layer, for example by stealing the encryption key or bypassing the encryption service.

In certain embodiments, the solution to this problem is to incorporate the data protection service into trusted firmware that is protected, by hardware, from the HLOS. This enables much higher level of assurance in the data protection solution without requiring any additional hardware components; in certain embodiments, only the memory protection and supervisor mode facilities available in common mobile device applications processors may be utilized.

In certain embodiments, vSED may present what looks like a self-encrypting drive (SED) to the HLOS, which may be referred to as a virtual self-encrypting drive. All security-critical aspects of DAR: authentication to unlock the SED, the encryption/decryption protocol, and key management may all occur outside of the HLOS environment, thereby protecting the stored data from external attack or malware to which the HLOS environment may be fully exposed.

The I/O Manager subsystem 410 may provide the physical storage (e.g. flash, SD, disk) management services. Each Virtual Machine subsystem may manifest a virtualized storage device 340 to its guest operating system, which thinks it has access to a standard block device. A User Domain may block write the following sequence of events:

User Domain (via guest OS) writes a block of data to virtualized storage

VM subsystem interposes the write, forwarding the data to the I/O Manager subsystem The I/O Manager subsystem forwards the data to the vSED subsystem for encryption vSED subsystem encrypts the data The I/O Manager stores the encrypted data to the appropriate location in physical storage that is allocated to the User Domain The I/O Manager informs the VM subsystem of the write completion, ensuring that the User Domain operation completes as expected, barring any other User Domain-resident failure In certain embodiments, the User Domain may read one or more blocks as follows:

User Domain (via guest OS) executes a block read request to virtualized storage

VM subsystem interposes the read, forwarding the request to the I/O Manager subsystem The I/O Manager reads the encrypted data from the appropriate location in physical storage that is allocated to the User Domain (note: with caching, it is possible that the encrypted block has been read in advance for performance and is already ready to be used).

The I/O Manager subsystem forwards the encrypted data to the vSED subsystem for decryption vSED subsystem decrypts the data The I/O Manager passes the data to the VM subsystem, informing it of the read completion and ensuring that the User Domain operation completes as expected In certain embodiments, the encryption and decryption may be executed in a trusted, securely partitioned INTEGRITY application in the Supervisor Domain and no other untrusted application on the platform can access the data encryption key or corrupt the cryptographic algorithms and their internal data.

When unlocking the encrypted disk for active use, the passphrase from the User Authentication subsystem may be converted to a key encryption key (KEK) used to decrypt the actual data encryption key (DEK). The DEK may be permanent and may be created internally when the system is first booted.

Figure 5:
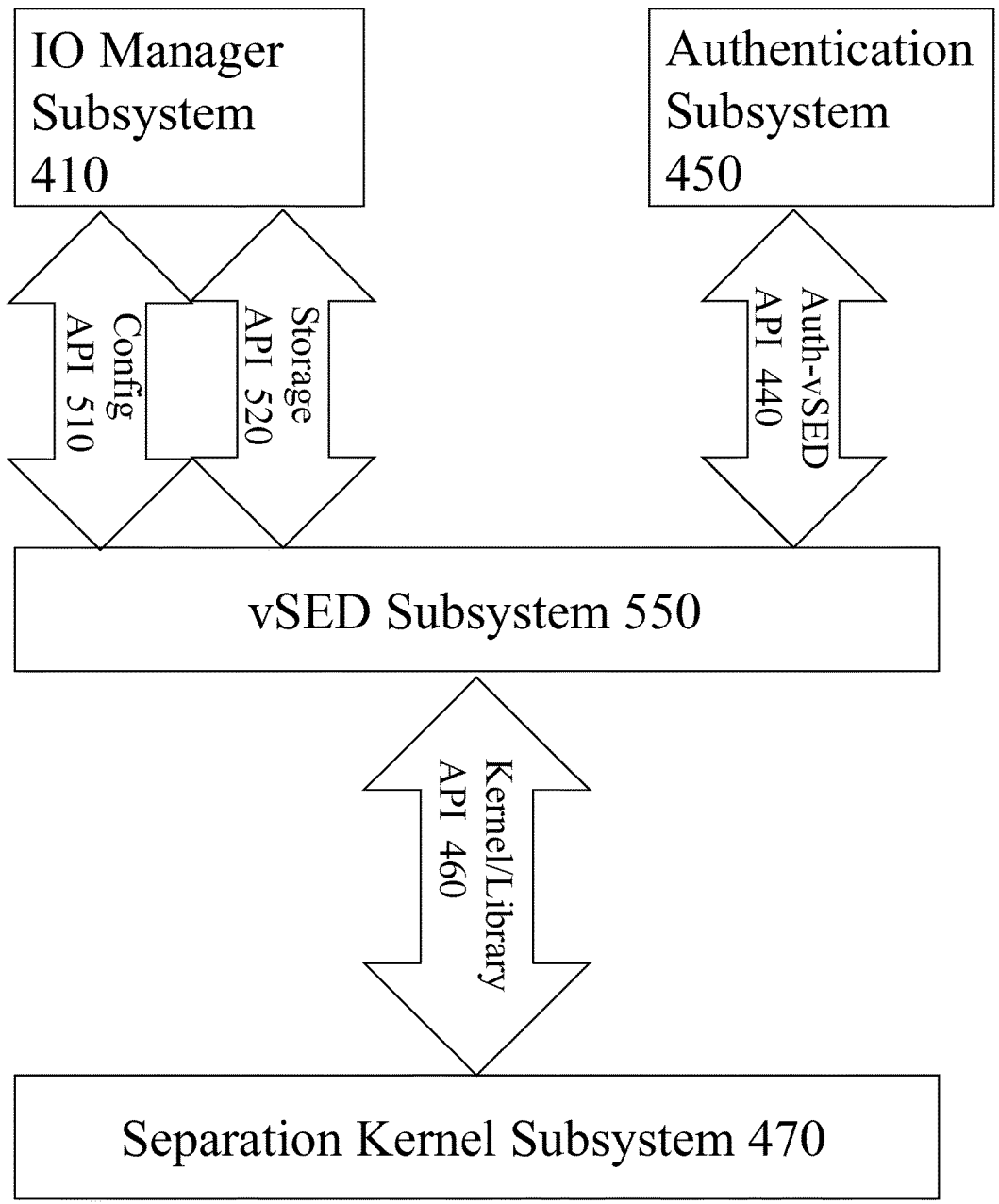
FIG. 5 illustrates a vSED subsystem in accordance with certain embodiments.

In certain embodiments, FIG. 5 shows interfaces to/from vSED subsystem 550. The Auth-vSED 440 interface is described above in connection with FIG. 4 for the User Authentication subsystem 450, and the separation kernel interfaces 470 may be standard control services.

The vSED subsystem 550 may use the Configuration API 510 to request configuration settings from the I/O Manager Subsystem 410. These configuration settings may include passphrase length minimum, stale passphrase time period, and potentially other passphrase management parameters.

The vSED subsystem 550 may use Storage API 520 to interface with the I/O Manager Subsystem 410 to transfer blocks of data for encryption and decryption.

In certain embodiments, a key encryption key (KEK) may wrap the data encryption key (DEK). The KEK may be derived from the system passphrase. In certain embodiments, a human user must set the passphrase (following configurable strength policy) on first boot of a protected User Domain. The KEK may be derived from the passphrase factor using an approved key derivation function.

The DEK may be generated internally and always wrapped with the current active KEK. The plaintext DEK may never be placed into any permanent storage. The key wrapping may use an approved key-wrapping algorithm. The DEK may be zeroed in RAM whenever it is not in use (e.g., when the user is logged out).

In certain embodiments, DEK generation may use true random bits seeded to an approved Deterministic Random Bit Generator ("DRBG"). If a secure element microSD is available and the System on a Chip's ("SoC's") built-in Random Number Generator ("RNG") is deemed to be of insufficient quality, then the secure element's random number generator/key generation facility may be used.

One exemplary encryption scheme is as follows

Key Encryption Algorithm: AES Key Wrap Specification; http://csrc.nist.gov/groups/ST/toolkit/documents/kms/AES-_key_wrap.pdf Block Encryption Algorithm: XTS-AES; NIST Special Publication 800-38E, Recommendation for Block Cipher Modes of Operation: The XTS-AES Mode for Confidentiality on Storage Devices; January, 2010. 128-bit strength keys are used (256-bits of keying material for XTS-AES algorithm). The encryption/decryption algorithm may be performed in software.

Key Derivation from Pass-Phrase: PBKDF2; http://csrc-.nist.gov/publications/nistpubs/800-132/nist-sp800-132.pdf (also see: PKCS #5: Password-Based Cryptography Specification Version 2.0; Internet Engineering Task Force, Request for Comments: 2898; September 2000). PBKDF2 requires a unique, permanent salt input. The salt shall be provisioned when vSED is initialized. If a secure element is not available, the salt shall be kept in storage accessible only to Supervisor Domain software. If a secure element is available, the salt shall be generated and stored internally within the secure element, retrieved and copied only temporarily to RAM when needed. A secure salt improves security by ensuring that a password dictionary attack is insufficient to recover the KEK. Essentially, the salt is treated as a private key input to a message authentication code generation function.

HMAC-SHA-256 is used within PBKDF2.

The PBKDF2 iteration count shall be at least 10,000.

In certain embodiments, vSED 550 may implicitly trust the configuration settings it reads. For a read data request entering vSED 550, vSED 550 may assert that the data be decrypted according to the applicable domain's cryptographic parameters before vSED 550 notifies the I/O Manager that the request has been completed. For data write requests entering vSED 550, vSED 550 may assert that the data be encrypted according to the applicable domain's cryptographic parameters before vSED 550 notifies the I/O Manager 410 that the request has been completed. vSED 550 may assume that the contents of data blocks provided to it for encryption/decryption are not modified by the I/O Manager 410 during the encryption/decryption operation (this is a data integrity concern as opposed to a confidentiality concern)—this may permits a zero-copy interface for bulk encryption/decryption requests between the I/O Manager 410 and vSED 550.

The authenticated user may be trusted. The user's passphrase may be all that is needed to unlock the encrypted vSED 550. If such a user needs to be revoked, a remote wipe may be performed using Mobile Device Management (MDM) technology managed by the User Domain and its associated network and administrators.

Physical (invasive or non-invasive) attacks on vSED's cryptography, if they must be addressed, are the responsibility of the environment.

The user may be trained to select high quality passphrases.

Administrator-configurable (multivisor.xml) settings for session locking timeout, passphrase length, and maximum passphrase reset time (age) may be assigned according to organizational needs.

The organization may ensure that users select unique passphrases.

An optional VPN client may run as a "bump-in-the-wire" between one or more physical network interfaces, which may include without limitation Wi-Fi or cellular network interfaces, and one or more User Domains.

In certain embodiments, the VPN client and its cryptographic protocols and keys may not be accessible or visible to the User Domains and hence may offers a high level of isolation from vulnerabilities that may be present in the User Domains, such as but not limited to Android User Domains. The VPN client may be based on StrongSwan, which supports Suite B compliant protocols and algorithms. Documentation for StrongSwan may be found at https://www-.strongswan.org.

The User Domain Android operating systems support native and third party VPN and other secure communications clients as well. These can be used instead of or in addition to the VPN depending upon system requirements.

In certain embodiments, a portable computing device is disclosed comprising: at least one general-purpose operating system; at least one virtualized storage device accessed by the operating system; at least one physical storage device that cannot be directly accessed by the operating system; and at least one virtualizing and obfuscating firmware module executing concurrently with the operating system on the same microprocessor. The virtualizing and obfuscating storage firmware module may manifest the virtualized storage device on behalf of the operating system and intercepts storage access transactions between the virtualized storage device and physical storage device. The virtualization module may perform obfuscation services of data as it is transacted between the virtualized storage device and physical storage device. The virtualizing and obfuscating storage firmware module may manifest at least one virtualized graphical display device accessed by the operating system. At least one physical graphical display device may be included that cannot be directly accessed by the operating system. The virtualizing and obfuscating storage firmware module may be configured to require input of obfuscation parameters by the user to the portable device using the graphical display device for input of the user's authentication information. The virtualizing and obfuscating storage firmware module may validate the obfuscation parameters prior to enabling the main operating system to use the obfuscated storage system. The obfuscation parameters may be a derivation of one or more authentication parameters originating from one or more authentication sources.

The virtualizing and obfuscating storage firmware module may be configured to provide a trusted indication to the user as to whether the graphical device is being used in an authentication parameter input mode or in a general operating mode. Color-coded pixels may be included on reserved portions of the graphical display that are controlled and programmed by the virtualizing and obfuscating storage firmware module to have distinct outputs corresponding to each distinct mode. The main operating system may be prevented by the virtualizing and obfuscating storage firmware module from modifying the appearance of the reserved portions of the graphical display. A portion of graphical display pixels may be positioned in distinct areas of the reserved portions of the graphical display that are controlled and programmed by the virtualizing and obfuscating storage firmware module, such that distinct positions correspond to each distinct mode. The main operating system may be prevented by the virtualizing and obfuscating storage firmware module from modifying the appearance of the reserved portions of the graphical display. On-board portable device LEDs or other visual indicators may be used that are controlled and programmed by the virtualizing and obfuscating storage firmware module to have distinct outputs corresponding to each distinct mode. The main operating system may be prevented by the virtualizing and obfuscating storage firmware module from modifying the appearance of the visual indicators. Multiple combinations of indications (such as both color and position of pixels within the reserved portion of the graphical display) may be used for increased assurance that the user can easily discern the distinct modes.

The virtualizing and obfuscating storage firmware module may be launched by a secure boot sequence requiring a hardware root of trust. The virtualizing and obfuscating storage firmware module firmware image may be measured by the computing device hardware and/or its immutable firmware and verified to match one or more known-good measurements pre-configured within the portable device hardware prior to executing the virtualizing and obfuscating storage firmware module. The virtualizing and obfuscating storage firmware module may be implemented as one or more additional logical threads of execution that may be mapped to one or physical threads or cores, as is common in modern multi-core portable device applications processors. The additional logical threads of execution may be used to enable the virtualizing and obfuscating storage firmware module to execute concurrently with other portions of the main operating system in order to improve overall storage latency and system performance.

Critical security parameters, such as encryption keys that must be kept private and that are used to realize strong obfuscation may themselves be obfuscated within the physical storage using obfuscation parameters that can only be derived from authentication parameters.

The virtualizing and obfuscating storage firmware module may contain a configurable time interval from the last successful input of authentication parameters that may enable operation of obfuscated storage services. Upon exceeding the time interval limit, the virtualizing and obfuscating storage firmware module may render one or more of itself, the obfuscated storage, the main operating system, and the portable device unusable for information processing until such time as a successful input of the authentication parameters is performed.

The virtualizing and obfuscating storage firmware module may control and manage one or more on-board portable device sensors, which may include without limitation a Global Positioning Satellite peripheral, to enforce a policy in which the virtualized storage system is only made available when the sensor readings are within an acceptable range of values. The main operating system may be unable to corrupt the sensor readings obtained by the virtualizing and obfuscating storage firmware module. One or more of a Global Positioning Service, cellular signals, or other location-based services may be used to enforce an availability policy based on an acceptable selection of location values or ranges.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

We claim:

1. A portable computing device, comprising:
   at least one operating system;
   at least one virtualized storage device configured to be accessed by the operating system;
   at least one physical storage device configured not to be directly accessible by the operating system; and
   at least one virtualizing and obfuscating storage firmware module configured for executing concurrently with the operating system on a processor.

2. The portable computing device of claim 1, wherein the virtualizing and obfuscating storage firmware module is configured to manifest the virtualized storage device on behalf of the operating system.

3. The portable computing device of claim 1, wherein the virtualizing and obfuscating storage firmware module is configured to intercept storage access transactions between the at least one virtualized storage device and the at least one physical storage device.

4. The portable computing device of claim 1, wherein the virtualizing and obfuscating storage firmware module is configured to perform obfuscation services of data as it is transferred between the at least one virtualized storage device and the at least one physical storage device.

5. The portable computing device of claim 1, wherein the virtualizing and obfuscating storage firmware module is configured to be launched by a secure boot sequence requiring a hardware root of trust.

6. The portable computing device of claim 1, wherein the virtualizing and obfuscating storage firmware module is configured to be measured by hardware of the portable computing device.

7. The portable computing device of claim 1, wherein the virtualizing and obfuscating storage firmware module is configured to be measured by immutable firmware.

8. The portable computing device of claim 1, wherein the virtualizing and obfuscating storage firmware module is configured to be verified to be valid by using one or more measurement parameters.

9. The portable computing device of claim 8, wherein the one or more measurement parameters comprise at least one of a cryptographic key and a certificate within the portable device hardware.

10. The portable computing device of claim 1, wherein the virtualizing and obfuscating storage firmware module is configured to be verified to be valid prior to execution.

11. The portable computing device of claim 1, wherein the virtualizing and obfuscating storage firmware module comprises one or more additional logical threads of execution that can be mapped to one or physical threads or cores.

12. The portable computing device of claim 11, wherein the additional logical threads of execution enable the virtualizing and obfuscating storage firmware module to execute concurrently with other portions of the at least one operating system to improve overall storage latency and system performance.

13. The portable computing device of claim 1, wherein the virtualizing and obfuscating storage firmware module is configured to control and manage one or more sensors to enforce a policy in which the virtualized storage system is only made available when one or more sensor readings are within an acceptable range of values.

14. The portable computing device of claim 13, wherein one or more sensors comprise at least one Global Positioning Satellite peripheral.

15. The portable computing device of claim 13, wherein the one or more sensor readings obtained by the virtualizing and obfuscating storage firmware module are resistant to corruption by the operating system.

16. The portable computing device of claim 13, wherein the one or more sensor readings are provided by at least one of a Global Positioning Service, a cellular signal, and another location-based services.

17. The portable computing device of claim 1, wherein the virtualizing and obfuscating storage firmware module is configured to manifest at least one virtualized graphical display device configured to be accessed by the operating system.

18. The portable computing device of claim 1, further comprising at least one physical graphical display device that cannot be directly accessed by the operating system.

19. The portable computing device of claim 17, wherein the virtualizing and obfuscating storage firmware module is configured to require input of one or more obfuscation parameters by a user to the portable device using the virtualized graphical display device.

20. The portable computing device of claim 19, wherein the virtualizing and obfuscating storage firmware module is configured to validate the one or more obfuscation parameters prior to enabling the operating system to use the virtualized storage system.

21. The portable computing device of claim 19, wherein the obfuscation parameters are derived from one or more authentication parameters originating from one or more authentication sources.

22. The portable computing device of claim 17, wherein the virtualizing and obfuscating storage firmware module is configured to provide a trusted indication to the user as to whether the virtualized graphical display device is being used in an authentication parameter input mode or in a general operating mode.

23. The portable computing device of claim 22, wherein one or more color-coded pixels are included on one or more reserved portions of a physical graphical display device that are controlled and programmed by the virtualizing and obfuscating storage firmware module to have distinct outputs corresponding to each distinct mode.

24. The portable computing device of claim 23, wherein the virtualizing and obfuscating storage firmware module prevents the operating system from modifying the appearance of the reserved portions of the physical graphical display device.

25. The portable computing device of claim 23, wherein one or more graphical display pixels are positioned in distinct areas of the reserved portions of the physical graphical display device that are controlled and programmed by the virtualizing and obfuscating storage firmware module, such that one or more distinct positions correspond to one or more distinct modes.

26. The portable computing device of claim 25, wherein the one or more distinct modes comprise multiple indications of color and position of one or more pixels within the reserved portion of the physical graphical display device.

27. The portable computing device of claim 23, wherein the virtualizing and obfuscating storage firmware module is configured to control one or more visual indicators to have distinct outputs corresponding to each distinct mode.

28. The portable computing device of claim 27, wherein the visual indicators comprise one or more on-board portable device LEDs.

29. The portable computing device of claim 27, wherein the virtualizing and obfuscating storage firmware module prevents the operating system from modifying the visual indicators.

30. A method of information-in-transit protection, comprising:
configuring at least one virtualized storage device to be accessed by an operating system;
configuring at least one physical storage device not to be directly accessible by the operating system; and
configuring at least one virtualizing and obfuscating firmware module for executing concurrently with the operating system on a processor;
wherein the method is performed by one or more hardware processors.

31. The method of claim 30, further comprising configuring the virtualizing and obfuscating storage firmware module to manifest the virtualized storage device on behalf of the operating system.

32. The method of claim 30, further comprising configuring the virtualizing and obfuscating storage firmware module to intercept storage transactions between the at least one virtualized storage device and the at least one physical storage device.

33. The method of claim 30, further comprising configuring the virtualizing and obfuscating storage firmware module to perform obfuscation services of data as it is transferred between the at least one virtualized storage device and the at least one physical storage device.

34. The method of claim 30, further comprising configuring the virtualizing and obfuscating storage firmware module to be launched by a secure boot sequence requiring a hardware root of trust.

35. The method of claim 30, further comprising configuring the virtualizing and obfuscating storage firmware module to be measured by hardware of the portable computing device.

36. The method of claim 30, further comprising configuring the virtualizing and obfuscating storage firmware module to be measured by immutable firmware.

37. The method of claim 30, further comprising verifying the virtualizing and obfuscating storage firmware module to be valid by using one or more measurement parameters.

38. The method of claim 37, wherein the one or more measurement parameters comprise at least one of a cryptographic key and a certificate within the portable device hardware.

39. The method of claim 30, wherein the virtualizing and obfuscating storage firmware module is configured to be verified to be valid prior to execution.

40. The method of claim 30, wherein the virtualizing and obfuscating storage firmware module comprises one or more additional logical threads of execution that can be mapped to one or physical threads or cores.

41. The method of claim 40, further comprising executing the virtualizing and obfuscating storage firmware module concurrently with other portions of the at least one operating system to improve overall storage latency and system performance.

42. The method of claim 30, further comprising configuring the virtualizing and obfuscating storage firmware module to control and manage one or more sensors to enforce a policy in which the virtualized storage system is only made available when one or more sensor readings are within an acceptable range of values.

43. The method of claim 42, wherein one or more sensors comprise at least one Global Positioning Satellite peripheral.

44. The method of claim 42, wherein the one or more sensor readings obtained by the virtualizing and obfuscating storage firmware module are resistant to corruption by the operating system.

45. The method of claim 42, wherein the one or more sensor readings are provided by at least one of a Global Positioning Service, a cellular signal, and another location-based services.

46. The method of claim 30, further comprising obfuscating at least one critical security parameter within the physical storage system using obfuscation parameters derived from one or more authentication parameters.

47. The method of claim 30, further comprising configuring the virtualizing and obfuscating storage firmware module to manifest at least one virtualized graphical display device configured to be accessed by the operating system.

48. The method of claim 47, further comprising configuring the virtualizing and obfuscating storage firmware module to provide a trusted indication to the user as to whether the virtualized graphical display device is being used in an authentication parameter input mode or in a general operating mode.

49. The method of claim 48, further comprising one or more color-coded pixels included on one or more reserved portions of a physical graphical display device that are controlled and programmed by the virtualizing and obfuscating storage firmware module to have distinct outputs corresponding to each distinct mode.

50. The method of claim 49, further comprising configuring the virtualizing and obfuscating storage firmware module to prevent the operating system from modifying the appearance of the reserved portions of the physical graphical display device.

51. The method of claim 49, further comprising positioning one or more graphical display pixels in distinct areas of the reserved portions of the physical graphical display device, such that one or more distinct positions correspond to one or more distinct modes.

52. The method of claim 49, wherein the one or more distinct modes comprise multiple indications of color and position of one or more pixels within the reserved portion of the physical graphical display device.

53. The method of claim 49, further comprising configuring the virtualizing and obfuscating storage firmware module to control one or more visual indicators to have distinct outputs corresponding to each distinct mode.

54. The method of claim 53, wherein the visual indicators comprise one or more on-board portable device LEDs.

55. The method of claim 53, further comprising configuring the virtualizing and obfuscating storage firmware module to prevent the operating system from modifying the visual indicators.

56. The method of claim 30, wherein the operating system cannot directly access at least one physical graphical display device.

57. The method of claim 30, further comprising configuring the virtualizing and obfuscating storage firmware module to require input of one or more obfuscation parameters by a user to the portable device using the virtualized graphical display device.

58. The method of claim 57, further comprising configuring the virtualizing and obfuscating storage firmware module to validate the one or more obfuscation parameters prior to enabling the operating system to use the virtualized storage system.

59. The method of claim 57, wherein the obfuscation parameters are derived from one or more authentication parameters originating from one or more authentication sources.

60. The method of claim 30, further comprising rendering at least one of the virtualizing and obfuscating storage firmware module, the obfuscated storage, the operating system, and the portable device unusable for information processing if a predetermined time interval has been exceeded since a last successful input of authentication parameters.

61. The method of claim 30, wherein the at least one of the virtualizing and obfuscating storage firmware module, the obfuscated storage, the operating system, and the portable device remains unusable for information processing until such time as a successful input of the authentication parameters is performed.

* * * * *